(12) United States Patent
Schopf

(10) Patent No.: US 7,464,484 B2
(45) Date of Patent: Dec. 16, 2008

(54) PROBE HEAD

(75) Inventor: Reinhold Schopf, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 297 days.

(21) Appl. No.: 11/513,293

(22) Filed: Aug. 29, 2006

(65) Prior Publication Data

US 2007/0051005 A1    Mar. 8, 2007

(30) Foreign Application Priority Data

Sep. 8, 2005    (DE) .................. 10 2005 042 558

(51) Int. Cl.
*G01B 5/016*    (2006.01)
(52) U.S. Cl. .......................... 33/561; 33/559
(58) Field of Classification Search ............ 33/503, 33/556–561
See application file for complete search history.

(56) References Cited

U.S. PATENT DOCUMENTS

| | | | |
|---|---|---|---|
| 5,041,806 A * | 8/1991 | Enderle et al. ............... 33/561 |
| 5,090,131 A | 2/1992 | Deer | |
| 5,327,657 A | 7/1994 | Hajdukiewicz et al. | |
| 5,345,690 A | 9/1994 | McMurtry et al. | |
| 5,669,152 A * | 9/1997 | McMurtry ............... 33/559 |
| 5,806,201 A * | 9/1998 | Feichtinger ............. 33/561 |
| 7,168,179 B2 * | 1/2007 | Baruchello et al. ......... 33/558 |
| 2006/0260148 A1* | 11/2006 | Baruchello et al. ......... 33/561 |
| 2007/0051005 A1* | 3/2007 | Schopf ..................... 33/561 |

FOREIGN PATENT DOCUMENTS

DE    30 16 782    11/1980
EP    0 423 307    4/1994

* cited by examiner

*Primary Examiner*—G. Bradley Bennett
(74) *Attorney, Agent, or Firm*—Kenyon & Kenyon LLP

(57) ABSTRACT

A probe head includes a stationary component and pressure-sensitive sensors, the sensors being stationary relative to the fixed component, and a deflectable probe element. The probe element has a longitudinal axis, a first contact point and a second contact point. Because of contact of the probe element, pressure forces are able to be introduced into the sensors via the first contact point. In response to a further deflection of the probe element, the latter is able to be transferred to a stop position, in which the second contact point of the probe element touches the stationary component in a supporting manner. The probe element is arranged such that the pressure forces that are able to be introduced into the sensors in the stop position are limited, a first distance between the first contact point and the longitudinal axis being shorter than a second distance between the second contact point and the longitudinal axis.

12 Claims, 5 Drawing Sheets

PROBE HEAD

CROSS-REFERENCE TO RELATED APPLICATIONS

The present application claims priority to Application No. 10 2005 042 558.5, filed in the Federal Republic of Germany on Sep. 8, 2005, which is expressly incorporated herein in its entirety by reference thereto.

FIELD OF THE INVENTION

The present invention relates to a probe head, e.g., having pressure-sensitive sensors.

BACKGROUND INFORMATION

A probe system normally includes a mobile probe head and a stationary part. Such a probe head is often used in the form of a probe switch or a switching probe having a deflectable probe element which generates a switching signal in response to a deflection out of its rest position. Such probe heads are used, e.g., for determining the position of workpieces. These may be clamped into material-working machines, machine tools, for example. In this context, the rest position of the probe element or a stylus should be understood to mean a position in which the stylus has no contact with the workpiece to be probed. When the stylus contacts the workpiece, the probe element is deflected from its rest position, even if only minimally, and an electrical signal is produced by a suitable transducer if the deflection or the force exerted on sensors in the probe head exceeds a specified threshold. The electrical signal is then frequently converted into an infrared signal so that a contactless and wireless signal transmission to the stationary part of the probe system is achieved in this manner.

A probe head of the kind mentioned above is described in European Published Patent Application No. 0 423 307, in which arms of a probe element or stylus holder cause deformations in the so-called seat elements when making probing contact, the deformations being measured and being able to trigger corresponding probe signals. For this purpose, the seat elements are slanted or arched in opposite pairs. Such an arrangement is believed to have several disadvantages. For example, in the case of great deflections of the probe element, individual sensors may be overloaded or destroyed, especially if highly sensitive sensors are being used.

SUMMARY

Example embodiments of the present invention may provide a probe head in which extremely sensitive sensors may be used for an accurate probing behavior and which may nevertheless be robust.

According to example embodiments of the present invention, the probe head includes a stationary module as well as sensors, each having a pressure-sensitive surface, electrical signals being producible by the sensors in response to the action of pressure forces that have a directional component that is orthogonal to the pressure-sensitive surface. The sensors are arranged stationary relative to the rigidly mounted component. Furthermore, the probe head includes a probe element that is deflectable with respect to the stationary component, the probe element having a longitudinal axis, a first contact point and a second contact point. Caused by touching of the probe element or by making probing contact, pressure forces are able to be initiated via the first contact point of the probe element into the sensors indirectly via a transmission element or directly by having the first contact point touching the surface of the sensor. Correspondingly, a level change in the electrical signal of at least one of the sensors is then able to be produced. In response to a further deflection of the probe element, the latter is able to be transferred to a stop position, in which the second contact point of the probe element touches the stationary component in a supporting manner. The probe element is arranged such that, in the stop position, the pressure forces that are able to be introduced into the sensors are limited, to protect the sensors, a first distance between the first contact point and the longitudinal axis being shorter than a second distance between the second contact point and the longitudinal axis.

A first contact point should be understood as a point that is on the probe element, and which is at the same time in contact with a transmission element or the surface of the sensor. Generally, several such first contact points are able to be present in one probe element, in this context. Thus, pressure forces are introduced indirectly or directly into a sensor in response to the touching of the probe head via a first contact point.

A second contact point should be understood as a point that is also on the probe element and that is used to support the probe element from a stationary component to protect the sensors. Here too, it is possible for several such second contact points to be present in one probe head. As a function of the probing contact direction, the position of the second contact points is able to be different, however, and such a second contact point is always at a greater distance from the longitudinal axis of the probe element than the appertaining first contact point.

The probe head may be arranged such that the first contact point of the probe element, in a rest position, is in contact with a transmission element which, in turn, touches the pressure-sensitive surface of one of the sensors. The probe element, the transmission element and the sensors are thus arranged such that they touch, so that pressure forces initiated by the probe element are conducted via the transmission elements into the sensors. A transmission element may be geometrically between one arm of the probe element and one sensor, the transmission element contacting both the respective arm of the probe element as well as the respective sensor in a rest position and/or a deflected position of the probe element.

The probe head may be arranged such that the pressure forces are directed substantially perpendicularly to the surface of the sensors.

The surfaces of the transmission elements are rounded off that contact the pressure-sensitive surface of the sensors or the probe elements. The transmission elements may be arranged as spheres.

The probe element may include a plurality of arms, on each of the arms both a first contact point and a second contact point being provided. The second contact point may be arranged at a shoulder of the probe element, in this context.

The probe head may include a holding element which is used for positioning the transmission elements with respect to the sensors, and which is fixed in a stationary manner relative to the sensors. The holding element may be configured such that the transmission elements are movable relative to the sensors in a direction which has a directional component orthogonal to the surface of the sensors. The holding element, which is a separate or discrete component, may be centrosymmetric. This may provide for achieving a uniform and directionally independent switching characteristic of the probe head.

The probe head may be configured such that at least one transmission element contacts at least one of the sensors in the rest position of the probe element.

The holding element allows not only for the exact positioning of the transmission elements relative to the sensors, but at the same time provides a defined prestress or pressure force on the sensors, even when, for example, an arm of the probe element has lifted off from the transmission element, so that even in this state there prevails a contact between the transmission element and the probe element due to the particular arrangement of the holding element. Particularly in highly sensitive sensors, this may provide that their pressure-sensitive surface is less exposed to wear or stress.

The probe head may be constructed such that the sensors are in a plane that is arranged perpendicular to the longitudinal axis of the probe element or of the stylus. For this purpose, three sensors offset by 120° may be used, which are respectively equidistant with respect to the longitudinal axis of the probe element.

The sensors may include piezoresistive silicon chips, since highly sensitive and highly accurate sensors may easily be damaged or destroyed in response to excessive pressure force stress.

It should be appreciated that precisely in the use of pressure-sensitive sensors, extremely small deflection movements normally result in a switching of the probe head. Accordingly, the rest position usually barely deviates from the deflected position. Nevertheless, the probe element may be deflectable with respect to the sensors because the probe element is movably supported with respect to the sensors.

The probe head, and, e.g., its probe element, may be configured so that the first contact point and the second contact point are arranged axially offset with respect to the longitudinal axis of the probe element. For example, the second contact point may be more distant from the end of the stylus than the first contact point, if the probe element includes a stylus. However, alternatively to this, the probe head may also be arranged such that the stationary component, e.g., a corresponding stop face of the stationary component, is arranged axially offset to the first contact point, with reference to the longitudinal axis of the probe element in the rest position.

According to an example embodiment of the present invention, a probe head includes: a stationary component; sensors, each sensor including a pressure-sensitive surface, the sensor adapted to produce electrical signals when a pressure force acts that has a directional component orthogonal to the pressure-sensitive surface, the sensors stationary with respect to the stationary component; and a probe component deflectable relative to the stationary component, the probe component including a longitudinal axis, a first contact point and a second contact point. By contact of the probe component, pressure forces are introduced into the sensors by the first contact point so that a level change in the electrical signal of at least one of the sensors is generated, and, in response to a further deflection of the probe component, the probe component is transferred to a stop position, in which the second contact point touches the stationary component in a supporting manner. The pressure forces that are introducible into the sensors are limited in the stop position, and a first distance between the first contact point and the longitudinal axis is shorter than a second distance between the second contact point and the longitudinal axis.

The first contact point, in a rest position, may be in contact with a transmission component that touches the pressure-sensitive surface of one of the sensors.

The probe head may include a holding component adapted to position the transmission component with respect to the sensors, and the holding component may be fixed in a stationary position relative to the sensors.

The probe component may include a plurality of arms, and a first contact point and a second contact point may be arranged at each of the arms.

The second contact point may be arranged at a shoulder of the probe component.

The transmission component may be arranged as a sphere.

The sensors may be mounted on a printed-circuit board.

The sensors may include piezoresistive silicon chips.

The first contact point and the second contact point may be positioned axially offset with respect to the longitudinal axis.

The probe component may include a stylus, and the second contact point may be arranged at a greater distance from an end of the stylus than the first contact point.

Further details and aspects of a probe head according to example embodiments of the present invention are described in more detail below with reference to the appended Figures.

DETAILED DESCRIPTION

Figure 1:
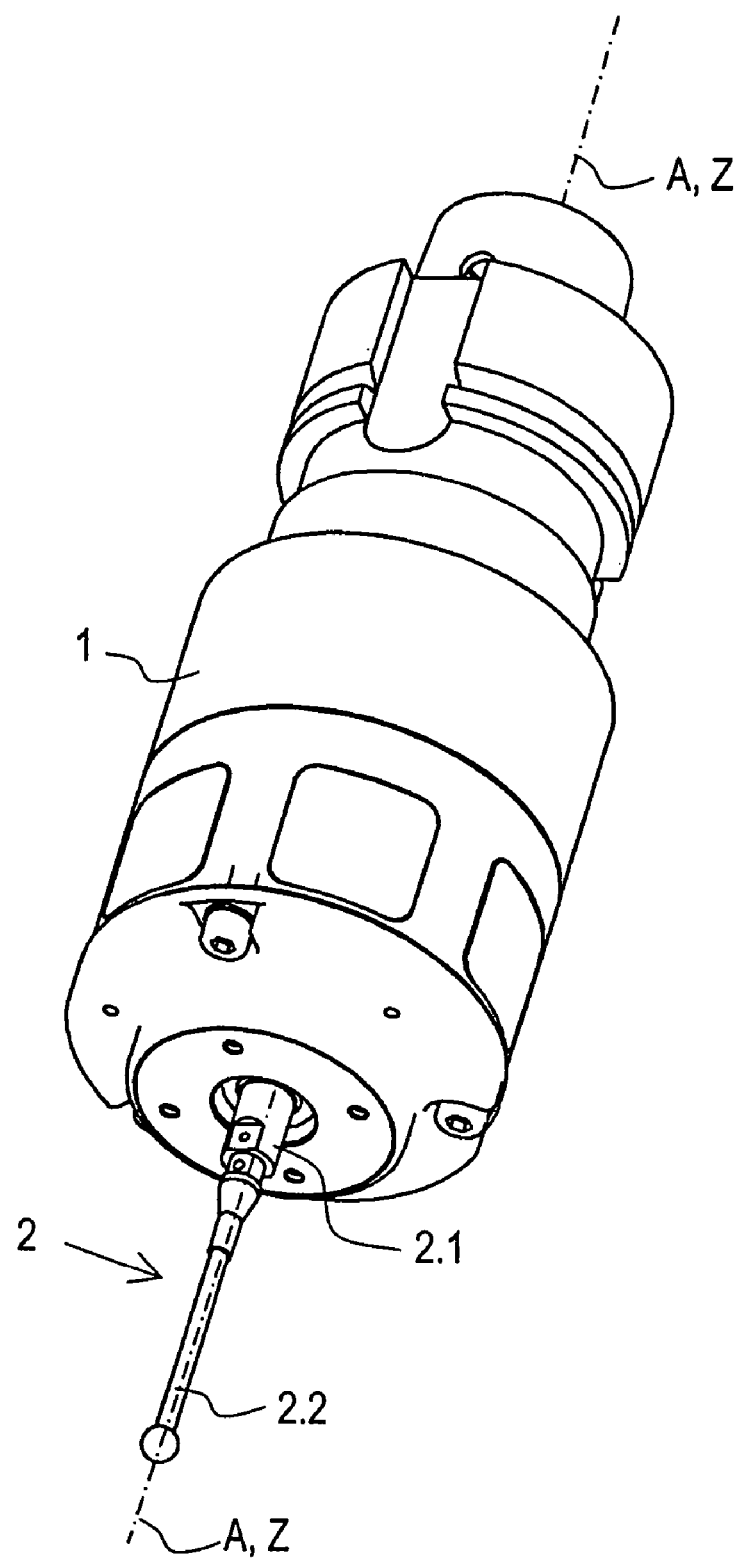
FIG. 1 is a perspective view of a probe head.
Figure 7:
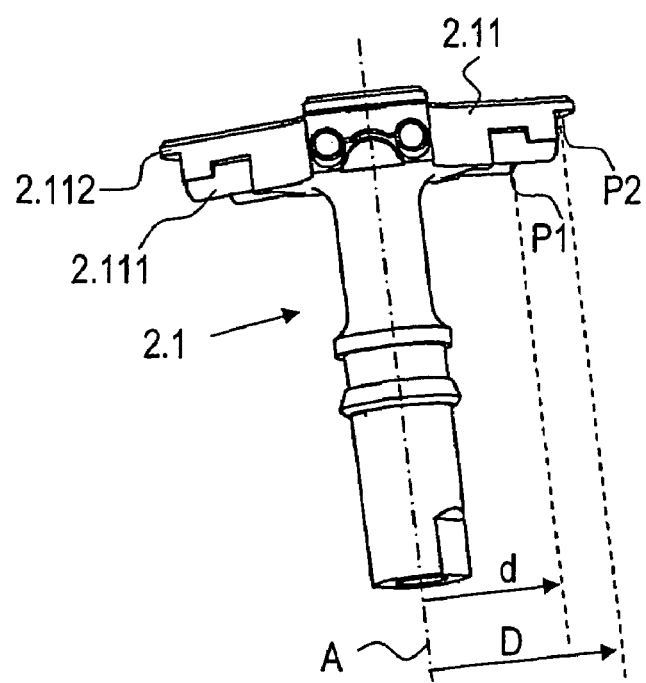
FIG. 7 is a detailed view of the stylus holder.

FIG. 1 is a perspective external view of a probe head. The probe head includes a housing 1 having a probe element 2 projecting from it. Probe element 2 has a longitudinal axis A, which in the rest state or in the rest position at the same time represents the longitudinal axis Z of housing 1. In the exemplary embodiment illustrated, probe element 2 includes two parts, e.g., a stylus holder 2.1 and a stylus 2.2, having a probing contact sphere as a stylus end (illustrated in FIG. 1, at the bottom). Stylus 2.2 further has a rupture joint. Stylus, holder 2.1 and stylus 2.2 are detachably connected to each other by a screw connection. Stylus holder 2.1 of probe element 2 has at one end three arms 2.11 offset by 120° (see, e.g., FIGS. 7 and 8). Two parallel cylindrical members 2.111 are attached on the bottom side of each arm 2.11. On the radial outer ends of arms 2.11 there is in each case a shoulder 2.112.

Figure 2:
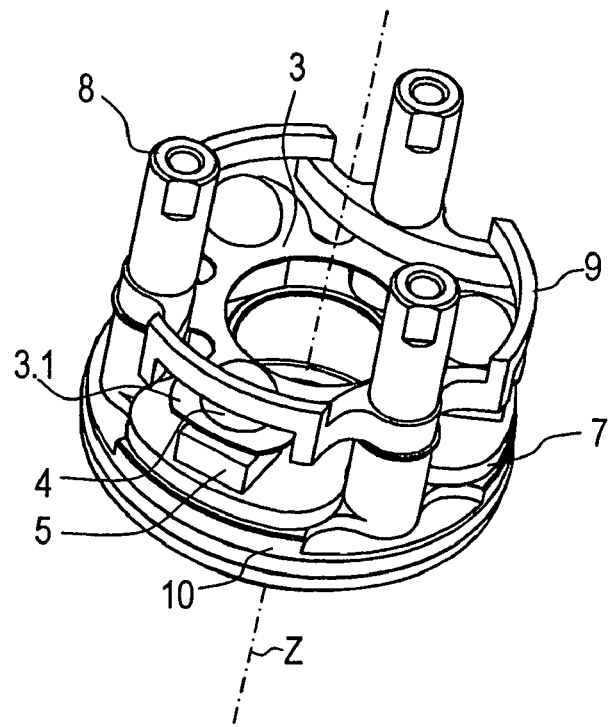
FIG. 2 is a perspective view of a measuring device in the probe head.

FIG. 2 illustrates a measuring device, as is arranged in the interior of housing 1. A printed-circuit board 7, on which three sensors 5 are mounted, is located on a substantially disk-shaped base member 10. In the exemplary embodiment illustrated, pressure sensor elements are used as sensors 5, which are based on piezoresistive silicon chips. These sensors 5 have a pressure-sensitive surface 5.1 (see, e.g., FIG. 4), in which pn-insulated bridge resistors are provided. In the operation of the probe head, a supply voltage for supplying sensors 5 is introduced via circuit board 7. In addition, the probe head includes, as a stationary component, an annular element 9 that is rigidly mounted with respect to sensor 5.

Spheres 4 rest on surface 5.1 of each sensor 5, which are used as mechanical transmission elements. In order for spheres 4 to be always positioned accurately with respect to sensors 5, a holding element 3 is provided, which is fixed in a stationary manner with respect to sensors 5.

Figure 3:
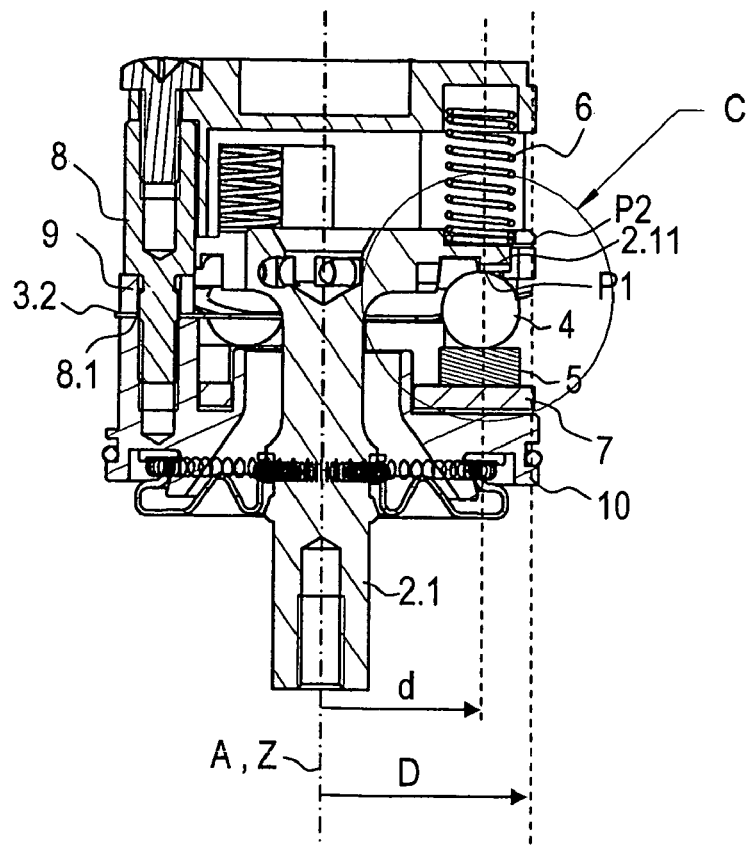
FIG. 3 is a partial cross-sectional view of the probe head.

FIG. 3 is a cross-sectional view of the probe head in a rest position. The probe head has printed-circuit board 7 which has sensors 5 mounted on it, the printed-circuit board being fixed to base element 10 with an exact fit. Stylus holder 2.1 of probe element 2 rests centrally in housing 1 of the probe head. Accordingly, longitudinal axis A of probe element 2 and an axis Z of annular element 9, or rather of housing 1, are congruent to each other in this rest position. Arms 2.11 of stylus holder 2.1, e.g., cylindrical elements 2.111, rest on spheres 4, prestressed by springs 6. In this context, one pair of cylindrical elements 2.111 whose distance is shorter than the diameter of spheres 4, in each case touches respective sphere 4 at first contact point P1. Prestressed by springs 6, stylus holder 2.1 is supported movably with respect to housing 1 and to annular element 9, and is thus also movable with respect to sensors 5, or rather deflectable.

The method of functioning the probe head is explained with reference to FIG. 8, which is a top view onto stylus holder 2.1. For example, the probe head is moved within the processing space of a machine tool in direction x. In the rest position of probe element 2, that is when stylus 2.2, or rather its probing contact sphere, has no contact with an obstacle, e.g., a workpiece, a specified pressure force is respectively introduced into sensors 5, corresponding to the prestressing of springs 6.

Figure 4:
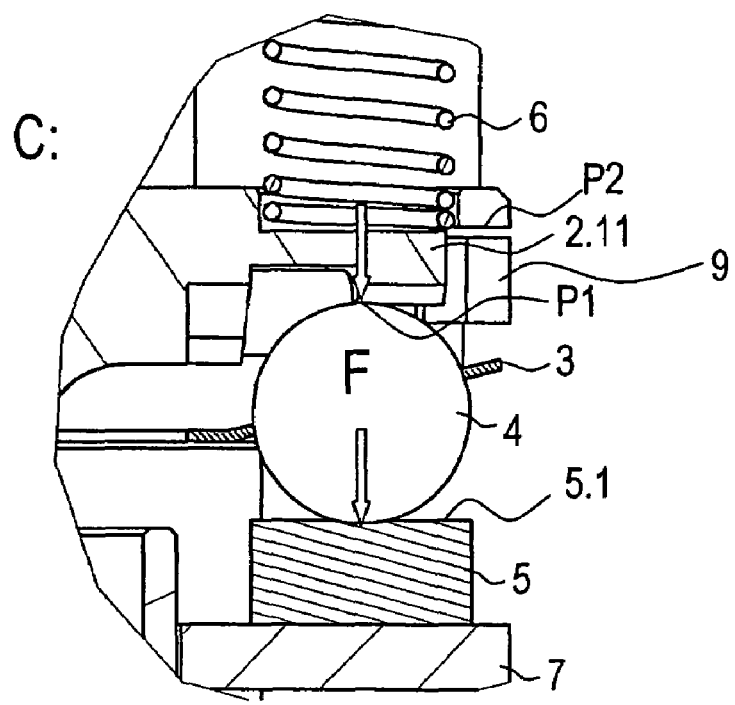
FIG. 4 is a detailed view of the measuring device of the probe head.

As soon as the probing contact sphere touches an obstacle at stylus 2.2, such as a workpiece to be measured, pressure forces F or changed pressure forces F are introduced via first contact point P1 first into appertaining sphere 4, which then passes on corresponding pressure forces F to assigned sensor 5 (see, e.g., FIG. 4). In this context, that sensor 5 which is assigned to left arm 2.11 in FIG. 8 measures a pressure force increase, while the two other arms 2.11 experience a reduction in pressure force. Sensors 5 each generate a corresponding level change in their electrical signals. The signals are processed further, and when they satisfy prespecified criteria, a switching signal is generated. The deflected or switching position is reached before one of arms 2.11 of probe element 2 loses mechanical contact at first contact points with P1 the respective sphere 4. This prevents the formation of a direction-dependent switching characteristic. The appropriate switching signals are converted to electromagnetic signals, which are transmitted to a stationary receiving station. The stationary receiving station is fixed in an immobile component of the machine tool, for example. From this stationary receiving station, the received signal is forwarded to an electronic system, for example, to the control system of the machine tool, where the position of the probing contact sphere is determined and at the same time the machine is stopped.

Figure 5:
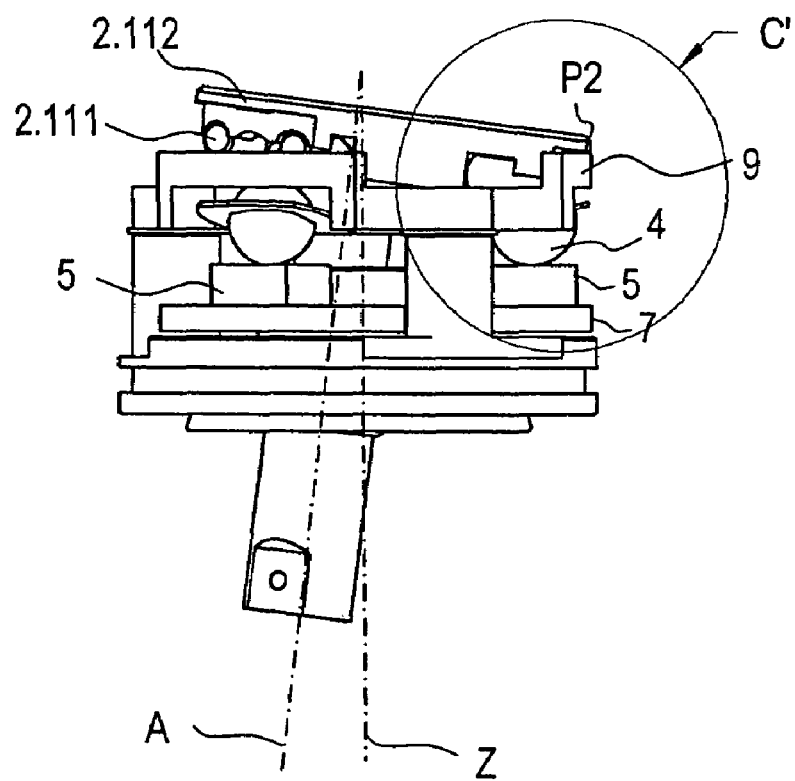
FIG. 5 illustrates the measuring device in the probe head in a stop position.
Figure 6:
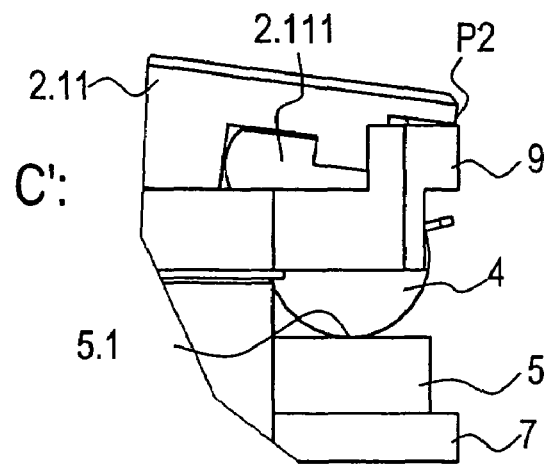
FIG. 6 is a detailed view of the measuring device of the probe head in the stop position.

For many different reasons it may be, however, that this stop is not triggered or is triggered late. Despite the rupture joint in stylus 2.2, it cannot be ensured, when using sensitive sensors 5, that they remain unimpaired in response to additional deflection of probe element 2. For this case of additional deflection, shoulder 2.112 is provided at each arm 2.11, as a mechanical stop. As illustrated in FIG. 5, if an excessive deflection of probe element 2 occurs, probe element 2 is transferred into a stop position. In this position, longitudinal axis A of probe element 2 and axis Z of annular element 9 or rather housing 1 are inclined to each other. Furthermore, shoulder 2.112 touches annular element 9 at a second contact point P2 of probe element 2. This achieves a supporting effect, and corresponding sensor 5 is no longer stressed mechanically, or rather its stressing is limited. Because of the geometric arrangement of probe element 2, even the pressure forces onto sensors 5 are reduced again by the lifting off of arms 2.11 from spheres 4 in the stop position. That is, the corresponding forces are diverted from annular element 9.

Figure 8:
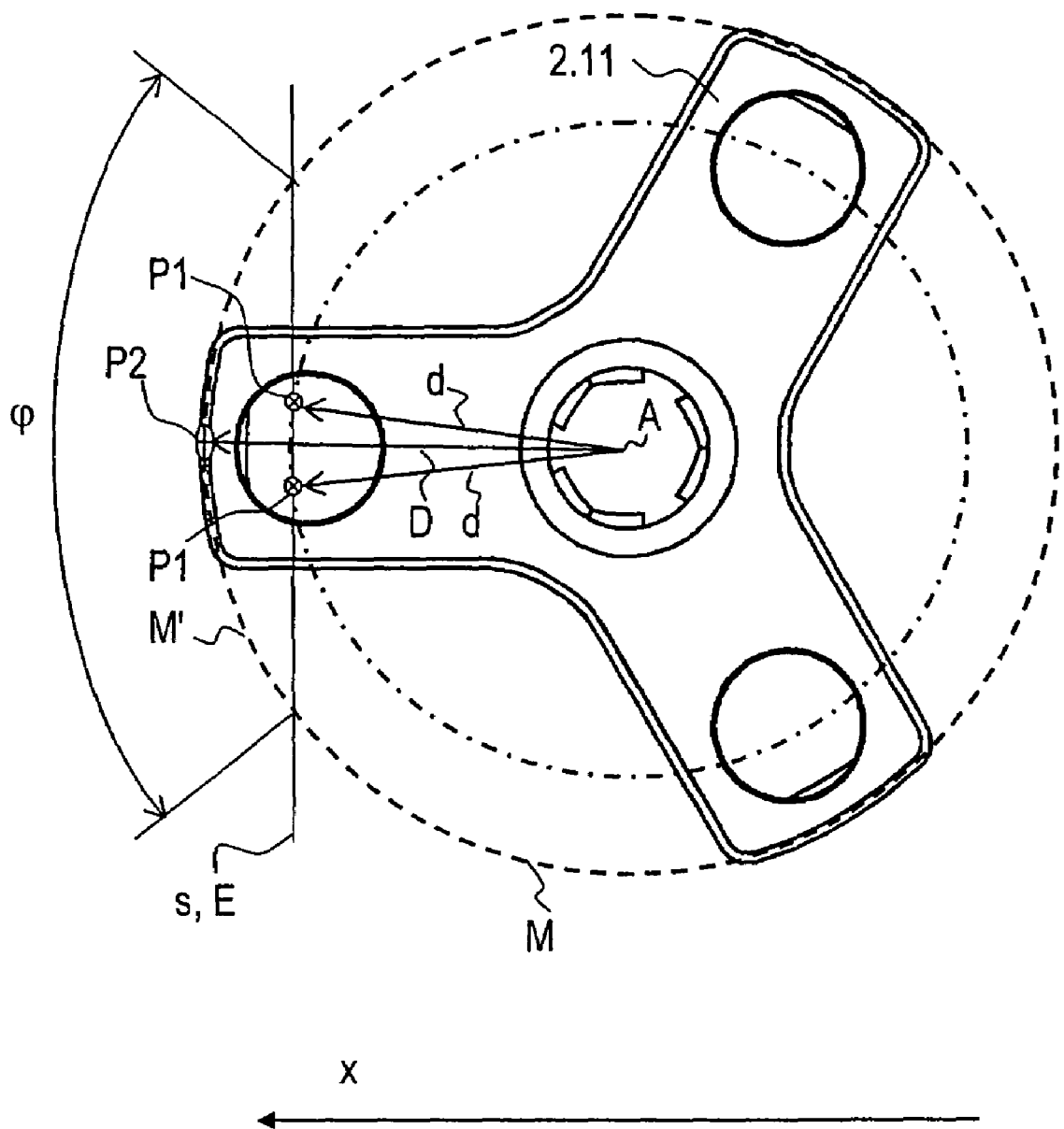
FIG. 8 is a top view of the stylus holder.

This behavior is achieved by a particular relative positioning of first contact point P1 and second contact point P2, which is explained further with reference to FIG. 8. If the probe head is moved further in direction x, probe element 2 swivels about a straight line s, on which the two first contact points P1 are located, until the left arm 2.11 illustrated in FIG. 8 touches annular element 9 at second contact point P2, and consequently, the stop position has been reached. Because distance d between first contact points P1 and longitudinal axis A is shorter than distance D between second contact point P2 and longitudinal axis A, a supporting contact is created of the probe element with respect to annular element 9.

A reliable method of functioning of the probe head is provided if second contact point P2 is located on a partial surface M' of a lateral surface M. Lateral surface M is assignable to a cylinder having the radius of second distance D and having longitudinal axis A (in the top view of FIG. 8, the dashed circular line having radius D corresponds to this cylinder). Furthermore, partial surface M' is limited by a plane E which is aligned parallel to longitudinal axis A, and on which straight line s comes to be located. In order to fix partial surface M', it should be noted that partial surface M' is the smaller of the two cut-through lateral surfaces, meaning that central angle $\phi$, appertaining to partial surface M', is less than 180°.

During constant motion of the probe head in the x direction, probe element 2 is thus first swiveled about axis s, and as soon as second contact point P2 touches annular element 9, this motion converts to a swiveling motion about second contact point P2. During additional motion of the probe head in the x direction, the rupture joint in stylus 2.2 will fail. Because of that, excessive stress in probe element 2 and annular element 9 in the area of second contact point P2 is to be avoided.

In the exemplary embodiment illustrated, the supporting contact for the protection of sensors 5 exists independently of probing contact direction or the moving direction of the probe head.

When the probe head is moved out of the stop position, probe element 2 returns to the rest position. Because spheres 4 are used as a transmission mechanism in the exemplary embodiment illustrated, there exists an optimum relative movability of probe element 2 with respect to annular element 9 and housing 1. Holding element 3 provides that spheres 4 are supported in each case reproducibly at the correct point on surface 5.1 of sensors 5, when probe element 2 returns from the stop position to the rest position. Spheres 4 remain positioned without change relative to sensors 5 with the aid of holding element 3. In addition, the three arms 2.11 rest exactly on spheres 4, the curvature of spheres 4 having an aligning or centering effect on probe element 2, as soon as probe element 2 or stylus holder 2.1 returns to its rest position.

What is claimed is:

1. A probe head, comprising:
   a stationary component;
   sensors, each sensor including a pressure-sensitive surface, the sensor adapted to produce electrical signals when a pressure force acts that has a directional component orthogonal to the pressure-sensitive surface, the sensors stationary with respect to the stationary component; and
   a probe component deflectable relative to the stationary component, the probe component including a longitudinal axis, a first contact point and a second contact point;

wherein, by contact of the probe component, pressure forces are introduced into the sensors by the first contact point so that a level change in the electrical signal of at least one of the sensors is generated, and, in response to a further deflection of the probe component, the probe component is transferred to a stop position, in which the second contact point touches the stationary component in a supporting manner;

wherein the pressure forces that are introducible into the sensors are limited in the stop position; and wherein a first distance between the first contact point and the longitudinal axis is shorter than a second distance between the second contact point and the longitudinal axis.

2. The probe head according to claim 1, wherein the first contact point, in a rest position, is in contact with a transmission component that touches the pressure-sensitive surface of one of the sensors.

3. The probe head according to claim 2, further comprising a holding component adapted to position the transmission component with respect to the sensors, the holding component fixed in a stationary position relative to the sensors.

4. The probe head according to claim 1, wherein the probe component includes a plurality of arms, a first contact point and a second contact point arranged at each of the arms.

5. The probe head according to claim 1, wherein the second contact point is arranged at a shoulder of the probe component.

6. The probe head according to claim 2, wherein the transmission component is arranged as a sphere.

7. The probe head according to claim 3, wherein the transmission component is arranged as a sphere.

8. The probe head according to claim 6, further comprising a holding component adapted to position the transmission component with respect to the sensors, the holding component fixed in a stationary position relative to the sensors.

9. The probe head according to claim 1, wherein the sensors are mounted on a printed-circuit board.

10. The probe head according to claim 1 wherein the sensors include piezoresistive silicon chips.

11. The probe head according to claim 1, wherein the first contact point and the second contact point are positioned axially offset with respect to the longitudinal axis.

12. The probe head according to claim 11, wherein the probe component includes a stylus, the second contact point arranged at a greater distance from an end of the stylus than the first contact point.

* * * * *